US008127717B1

(12) United States Patent
Trodella

(10) Patent No.: US 8,127,717 B1
(45) Date of Patent: Mar. 6, 2012

(54) WASTE DEPOSIT STATION

(76) Inventor: Melanie Rose Trodella, Fort Lauderdale, FL (US)

(*) Notice: Subject to any disclaimer, the term of this patent is extended or adjusted under 35 U.S.C. 154(b) by 13 days.

(21) Appl. No.: 12/587,913

(22) Filed: Oct. 15, 2009

(51) Int. Cl.
*A01K 1/01* (2006.01)
(52) U.S. Cl. ...................................... 119/161
(58) Field of Classification Search ............ 119/161, 119/163, 165, 166, 706; D30/161
See application file for complete search history.

(56) References Cited

U.S. PATENT DOCUMENTS

| | | | | |
|---|---|---|---|---|
| 1,773,141 | A * | 8/1930 | Hodgson | 119/165 |
| 2,230,861 | A | 2/1941 | Buehler | |
| 2,894,487 | A * | 7/1959 | Goldson | 119/706 |
| 3,339,527 | A | 9/1967 | Burroughs | |
| 3,752,121 | A | 8/1973 | Brazzell | |
| 3,857,747 | A * | 12/1974 | Bitecola | 428/17 |
| D237,392 | S * | 10/1975 | Freeborn | D30/161 |
| 3,964,437 | A * | 6/1976 | Brown | 119/161 |
| 4,177,763 | A * | 12/1979 | Cook | 119/706 |
| D254,814 | S * | 4/1980 | Kossar | D30/158 |
| D254,815 | S * | 4/1980 | Kossar | D30/158 |
| D307,201 | S * | 4/1990 | Gold | D30/161 |
| 5,080,046 | A * | 1/1992 | Cassone | 119/168 |
| D326,740 | S * | 6/1992 | Barreto et al. | D30/118 |
| 5,193,488 | A * | 3/1993 | Walton | 119/166 |
| 6,079,363 | A | 6/2000 | MacLaine | |
| 6,343,569 | B1 * | 2/2002 | Buendiger | 119/706 |
| 6,490,996 | B1 * | 12/2002 | Terry | 119/706 |
| 6,640,750 | B2 * | 11/2003 | Rowe et al. | 119/706 |
| 6,763,782 | B1 * | 7/2004 | Kordelin | 119/166 |
| 7,249,570 | B1 | 7/2007 | Roberson | |
| D612,553 | S * | 3/2010 | Stetelman | D30/161 |
| 2005/0263096 | A1 * | 12/2005 | Mita et al. | 119/706 |
| 2007/0289541 | A1 * | 12/2007 | Giardina | 119/165 |
| 2008/0216763 | A1 * | 9/2008 | Ebert | 119/706 |

* cited by examiner

*Primary Examiner* — Yvonne R. Abbott
(74) *Attorney, Agent, or Firm* — Malloy & Malloy, P.A.

(57) ABSTRACT

A waste station which facilitates the deposit of urine by a male dog and structured for use primarily, but not exclusively, in an indoor or other environment where the deposit of waste is typically inappropriate. The station includes a base formed of a flexible, absorbent material. An elongated pole, dimensioned to accommodate the size of the dog intending to use the station, is disposed on the base inwardly of the surrounding periphery thereof and includes an absorbent material covering structure disposed in overlying or covering relation to the pole. The base may be removably secured to a supporting surface within the environment and the pole may comprise either a fixed/rigid structure or a collapsible structure and be connected or disposed in an extended, operative orientation extending outwardly from the base. When incorporating the collapsible structure, the pole may be disposed in a substantially collapsed, stored orientation to facilitate storage or transport thereof.

21 Claims, 4 Drawing Sheets

WASTE DEPOSIT STATION

BACKGROUND OF THE INVENTION

1. Field of the Invention

This invention is directed to a waste station structured to accommodate the deposit of urine by a male dog in an indoor or other environment comprising a base and a pole extending upwardly and inwardly from the base thereby accommodating the "leg lifting" posture of a male dog typically assumed while urinating. Both the base and a covering structure of the pole are formed from an absorbent material of sufficiently versatile structure to be disposed of or alternatively washed after one or more depositing visitations by the dog.

2. Description of the Related Art

Pet ownership and in particular the owning and maintaining of dogs is popular throughout many areas of the world. Responsibilities associated with dog and other type pet ownership include the providing of adequate facilities which enable a dog to exercise and also to deposit the animal's waste products. Typically, dogs may defecate only once a day. However, a dog may frequently urinate throughout a given period in order to properly eliminate the associated waste. In addition, "territory marking" is a common habit with male dogs and unfortunately may occur relatively frequently in both an indoor and outdoor environment due to the animal's natural instincts.

Accordingly, in order to provide adequate facilities for the elimination of waste, most dogs and other type pets are walked or otherwise provided access to the outdoors. However, many local agencies have enacted ordinances or regulations which restrict or otherwise regulate tethering of the animal and the disposal of waste products eliminated by a pet. Accordingly, absent the availability of an enclosed backyard or other outdoor area suitable for waste elimination, there may be numerous occurrences throughout the day when a male dog's natural tendency is either to demonstrate its dominance over a specific territory or otherwise relieve itself through urination.

More specifically, male dogs often "mark" objects that are new and brought into the home or other area occupied by the animal. As set forth above, such "urine marking" is a natural extinct of many male dogs in order to demonstrate "ownership" of a given indoor or outdoor area. The inherent drive of a male dog to perform such territorial marking is a natural instinct and accordingly may be a difficult habit to overcome. Naturally activities of this type are particularly troublesome when they occur indoors or in other inappropriate areas which may be commonly occupied or frequently accessed by the animal's owners.

Accordingly there is a need in this area for a waste station or like assembly specifically structured to facilitate the collection of urine which satisfies a male dog's natural instincts, but which eliminates or significantly reduces the possibility of damage being done to surrounding objects such as furniture, floors or the like. In addition, a proposed and preferred waste station should also be dimensioned and configured to accommodate the natural "leg lifting" tendencies of male dogs thereby facilitating the use of such a waste station and satisfying a male dog's natural tendency to mark their territory or alternatively to collect periodically deposited urine. Moreover, such a preferred and proposed waste station should have an absorbent material base of adequate size and configuration to extend in overlying, covering and/or protecting relation to a supporting surface(s) and or objects. In addition, the proposed waste station should also include an upstanding "pole" disposed within the peripheral boundaries of the base and being of a sufficient height to extend upwardly and inwardly from the base, a distance which will generally accommodate the size of the dog utilizing the waste station.

Finally, the absorbent material and other structural features of such a proposed waste station should have sufficient structural integrity and absorbency characteristics to collect virtually all of the urine deposited thereon, while in at least one embodiment, be capable of being disposed of or possibly washed after one or more urine deposits.

SUMMARY OF THE INVENTION

The present invention is directed to a station structured to facilitate the deposit of urine by a male dog, wherein the station is specifically dimensioned, configured and structured to be used in an indoor or other inappropriate environment where pet waste deposits are not intended to occur. More specifically, the waste station comprises a base disposable in covering, overlying or other protecting relation to supporting and/or adjacent surfaces or areas within or associated with the inappropriate environment. Such a supporting surface could be the exterior or exposed surface of a floor, floor covering, etc. and/or the combined surfaces of a floor, etc. and a substantially vertically or transversely oriented adjoining surface of a wall, furniture or other adjacently disposed object or structure.

Recognizing that most male dogs have a natural tendency to assume a "leg-lifting" position while urinating or while "marking territory", the waste station structure of the present invention also includes an elongated pole. The pole extends upwardly and inwardly from the base and is disposed inwardly from the peripheral boundaries of the base such as, but not limited to, a substantial midpoint or other appropriate location on the base. As used herein, the term "midpoint" is not meant to describe the precise or even general center of the base in that the base may be regularly or irregularly configured. However, the pole should be located a sufficient inwardly spaced distance from the peripheral boundaries of the base so as to prevent or significantly reduce the possibility of urine spray extending beyond the boundaries of the base.

In addition, in order to accomplish efficient collection and prevent leakage of the deposited urine, both the base and the pole are at least partially formed from an absorbent material. The absorbent material may take a variety of different natural or man-made materials. However, in at least one embodiment, the absorbent material from the base and/or a covering structure associated with the pole may be at least generally similar to that used in disposable diapers, sanitary pads, etc. As such, the material from which the base is formed may be at least partially quilted, padded, etc. and be sufficiently flexible to be easily collapsed or folded. Such a collapsed or folded orientation facilitates storage and transport thereof. The flexibility of the base also facilitates its protective positioning, such as when the base is disposed in overlying, covering relation to either the horizontal floor surface or an adjacent substantially vertically or transversely oriented wall, furniture or other object surface.

In contrast, the pole may include an at least semi-rigid frame which may have a fixed configuration or alternatively, in at least one embodiment, may be of a collapsible construction. In either of these embodiments, an absorbent material covering structure may be considered to be a part of the pole at least to the extent of being structured to overlie and at least partially enclose the exterior portions of the pole. As such, both the internal and external configuration of the covering structure should substantially correspond to the configuration of the pole. Further, in at least one embodiment of the pole, the configuration thereof includes a substantially conical or otherwise continuously converging configuration along the length thereof from a proximal end adjacent the base to an upwardly disposed distal end. In turn, the covering structure may be in the form of a correspondingly configured sleeve which is fixedly or preferably removably disposed in an intended operative position in overlying, covering relation to the exterior of the pole, as set forth above.

While the covering structure may be fixedly secured to the pole, at least one preferred embodiment comprises the sleeve and the pole being cooperatively structured and configured to facilitate the removable placement of the sleeve-like covering structure in the operative position. Therefore, the aforementioned substantially continuously converging configuration of the pole and accordingly that of the sleeve allows the sleeve to be easily removed for disposal or cleaning without excessive handling, touching, etc, which would of course be undesirable after urine has been deposited thereon.

As set forth above, one feature of the base of the waste station of the present invention includes its formation or structure from a substantially flexible material. Flexibility of the material therefore allows it to be selectively disposed in various operative positions, overlying adjacently disposed floor and wall surfaces as well as its selective disposition into a stored orientation for storage, transport, packaging, etc. However, due to such flexibility an additional feature of the base may include a connecting assembly preferably, but not necessarily, comprising an adhesive material. As such, an adhesive connecting assembly serves to adhesively interconnect the base in stable, but removable position overlying the intended surface(s) to be protected from the deposited urine. The adhesive connecting assembly may be formed as a fixed or integral part of the base or may be removably disposed in the aforementioned interconnecting relation between the base and the supporting surface(s).

As also set forth above, the pole may include a collapsible structure facilitating its selective disposition in either an upwardly extending, operative orientation or a substantially collapsed, stored orientation. In one embodiment, the collapsible structure may be defined by at least one biasing member included in the structure of the pole. As such, the at least one biasing member is disposed and structured to normally bias the pole in the extended, operative orientation. Further, the biasing force of the biasing member may be sufficient to "automatically" dispose the pole in its upwardly extending operative position once it is released from a retaining structure or assembly. Accordingly, in this embodiment of the pole it may include a "pop-up" type of operative feature.

Alternatively, another embodiment of the collapsible pole structure may comprise a plurality of layers or segments interconnected by integral or other appropriately structured hinges or connectors. As such, the plurality of segments of the cone may be selectively disposed in either an extended or partially extended operative orientation or the collapsed, stored orientation. In the latter, stored orientation, the plurality of pole segments may be collectively disposed in a collapsed, at least partially "flattened", position wherein the various segments are collectively disposed in a generally concentric array. Moreover, the formation of the pole from a plurality of segments facilitates a positioning of the pole such that it has only a portion of its length extending upwardly from the base into an operative position, rather than extending upwardly from the base along its full length. Moreover, the aforementioned continuous converging configuration such as, but not limited to, a cone also facilitates positioning of the pole, in either embodiment of the collapsible structure, between the operative orientation and the stored orientation.

Furthermore, regardless of the structure of the pole being collapsible or fixed, as described above, it may extend upwardly and/or be selectively disposed into an angled, skewed or other non-perpendicular orientation relative to the base and/or the supporting surface on which the base is disposed and therefore comprise a configuration other than a conical or continuously converging configuration. Further by way of example only, the pole may extend upwardly from the base into its operative position, while automatically assuming or being selectively disposed or shaped into a bent or curvilinear configuration along at least a portion of its extended length.

Accordingly, the waste station of the present invention, including each of its plurality of embodiments, overcomes many of the disadvantages and problems associated with the deposit of waste, particularly urine, by a male dog in an indoor or other normally inappropriate environment where the deposit of animal waste is not typically desirable.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
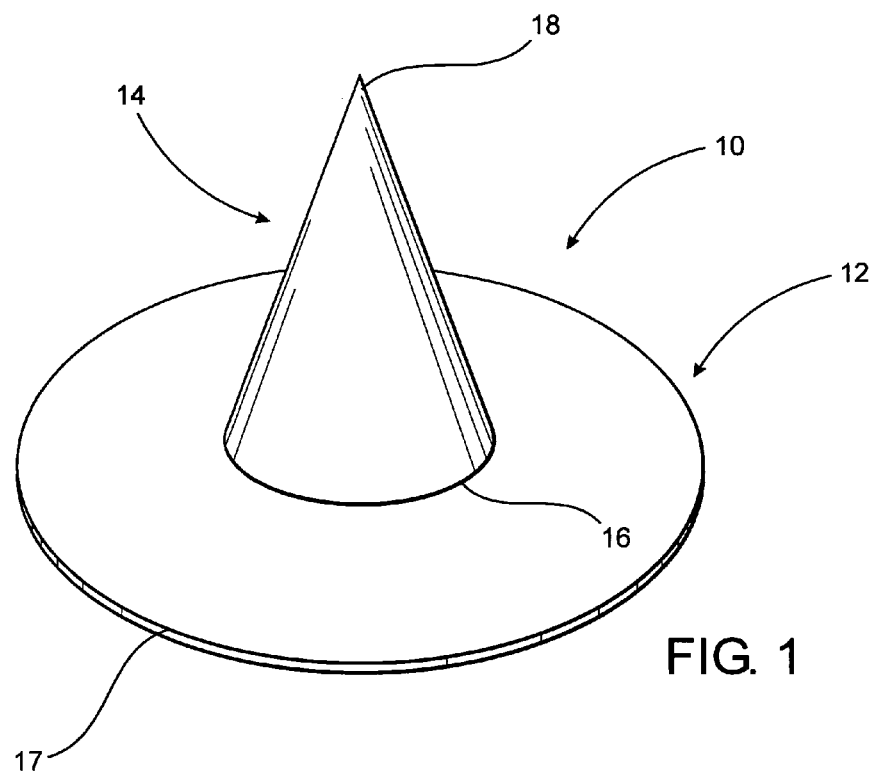
FIG. 1 is a perspective view of one preferred embodiment of the waste deposit station of the present invention in an assembled form.

As represented in the accompanying Figures, the present invention is directed to a waste deposit station generally indicated as 10. Further, the various preferred embodiments of the waste deposit station 10 is specifically, but not exclusively, structured to accommodate a male dog which typically has the inherent or natural tendency of "leg lifting" while urinating. As set forth above, such leg lifting habits frequently occur during the normal urination act in addition to the tendency of a male dog to perform a "territorial marking" process.

Accordingly, each of the preferred embodiments of the waste deposit station 10 includes a base generally indicated as 12 and a pole, generally indicated as 14. As represented, the pole 14 includes a proximal end 16 connected to or disposed adjacent to the base, preferably in predetermined spaced relation to the periphery of the base such as, but not limited to a mid-portion 15 thereof. In contrast, the pole 14 also includes a distal end 18 disposed in upwardly spaced relation to the base 12. Moreover, the pole 14 extends upwardly and inwardly from the base 12 and therefore provides a structure which accommodates the above noted "leg lifting" tendencies of a male dog.

At least a portion or preferably substantially the entirety of the base 12 is formed from a flexible, liquid absorbent material. As such, the absorbent characteristics of the material from which most or at least a portion of the base 12 is formed will be sufficient to absorb and retain urine deposited thereon by the dog. Further, the flexibility of the material from which the base 12 is formed is also sufficient to facilitate its collapse or disposition in folding orientation. This structural characteristic allows it to be significantly reduced in volume or size so as to facilitate its storage and transport. Also, as demonstrated in FIG. 1A, the base 12 is sufficiently flexible to be disposed in overlying, covering and/or protective relation to a floor, floor covering or other support surface 19. In addition and dependent on the specific location of the deposit station 10 within an indoor or other environment, generally and schematically indicated as 20, at least a portion of the base 12 may be disposed in overlying, covering and protective relation to a vertical or other transversely oriented support surface 19'. Therefore, when the deposit station 10 is placed on a floor or other supporting surface 19 which is disposed adjacent a wall, furniture structure, or other object surface 19', the base 12 can be at least partially folded into the overlying, covering, protective relation to the adjoining or adjacent wall or other object surface 19'.

Figure 1A:
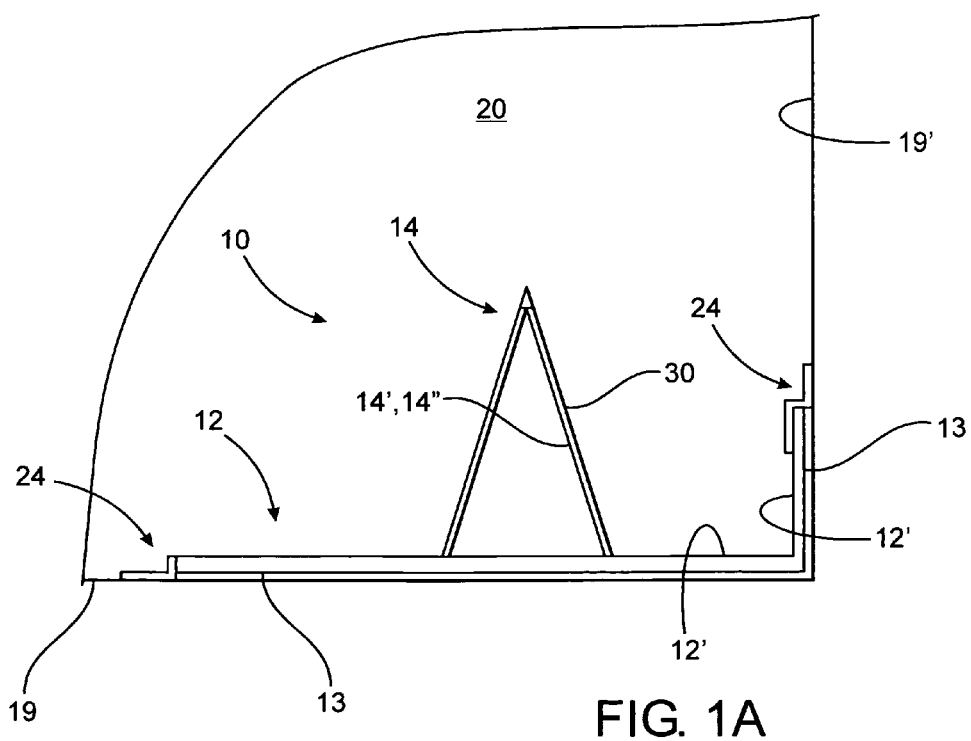
FIG. 1A is a side view in partial schematic of the preferred embodiment of FIG. 1 positioned in one of a possible plurality of locations in an indoor or other preferred embodiment.

In that at least the portion of the base 12 is formed from an absorbent material, as at 12' in FIG. 1A, an additional preferred embodiment of the present invention includes a bottom or under layer of material 13, which is preferably formed from a liquid impermeable material attached to the inner or lower most surface of the absorbent material 12'. As such, leakage or passage of the collected urine within the absorbent material 12 is prevented from reaching the supporting surfaces 19 or 19' which the base 12 overlies and protects. Further, the fluid impermeable under layer 13 may thereby define the under surface of the base 12 or alternatively may be incorporated into the absorbent material 12' in a location spaced from the under surface of the base 12.

As also represented in FIG. 1A, due to the flexibility of the base 12 at least one preferred embodiment of the waste station 10 includes a connecting assembly, generally indicated as 24, which may be defined by an adhesive material fixedly or integrally connected to the base 12 or removably connected thereto. In either of the above integral or removable modifications, the connecting assembly 24 is at least partially formed from an adhesive material wherein the connecting assembly 24 serves to adhesively, but removably connect the base 12 to the supporting surface 19 and/or 19' as indicated.

Figure 2:
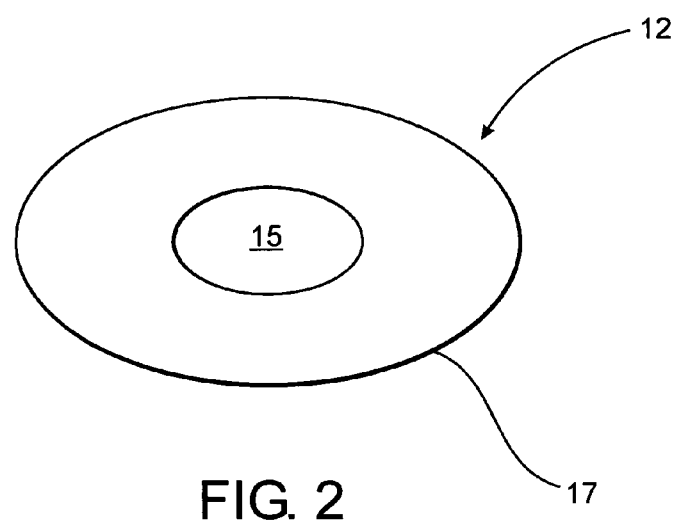
FIG. 2 is a perspective view of a base portion of the embodiment of FIG. 1 in a non-assembled form.

As set forth above, when in its assembled, operative form, the deposit station 10 includes both the base 12, as described above, and the elongated, upstanding pole 14. As also described, the pole 14 may be fixedly connected to the base substantially at a "mid-portion" 15 or other inwardly spaced position relative to the periphery 17 of the base 12. Alternatively, the pole 14 may be removably connected to the base such as by having its proximal end 16 removably positioned but at least partially and removably attached to the base 12 such as at the mid-portion or other inwardly spaced location 15, as represented in FIG. 2.

Figure 3:
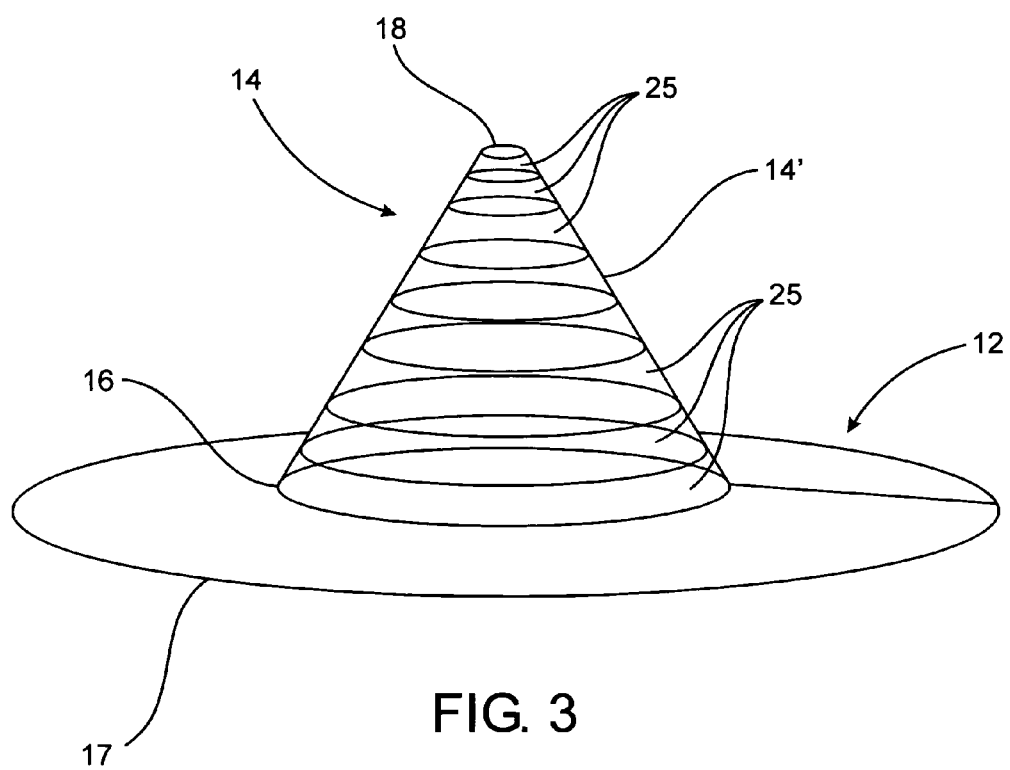
FIG. 3 is a perspective view of a base portion and a pole portion of yet another preferred embodiment of the present invention in partially assembled form.
Figure 3A:
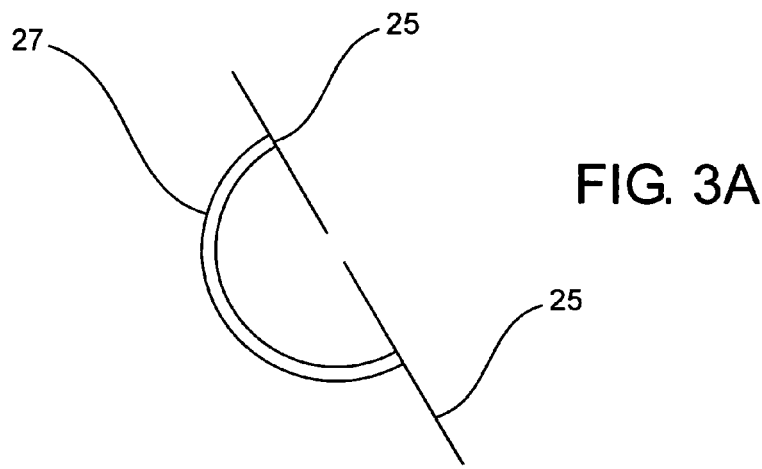
FIG. 3A is a schematic representation in partial cutaway of a connecting hinge associated with at least one preferred embodiment of the pole portion of the present invention.

With primary reference to FIG. 3, the pole 14 may include a supporting frame having an at least partially or selectively rigid structuring as at 14'. More specifically, the pole 14 and the support frame 14' may be defined by a substantially rigid, upstanding, non-collapsed structure or alternatively by a collapsible structure. When collapsible, the pole 14 and the support frame 14' may be selectively disposed into a collapsed, stored orientation generally represented in FIG. 3B. As such, the stored orientation may comprise a plurality of concentrically oriented segments 25. Moreover, the pole segments 25 are represented in their upwardly extended, operative orientation in FIG. 3 and in the aforementioned collapsed or stored orientation in FIG. 3B.

Figure 3B:
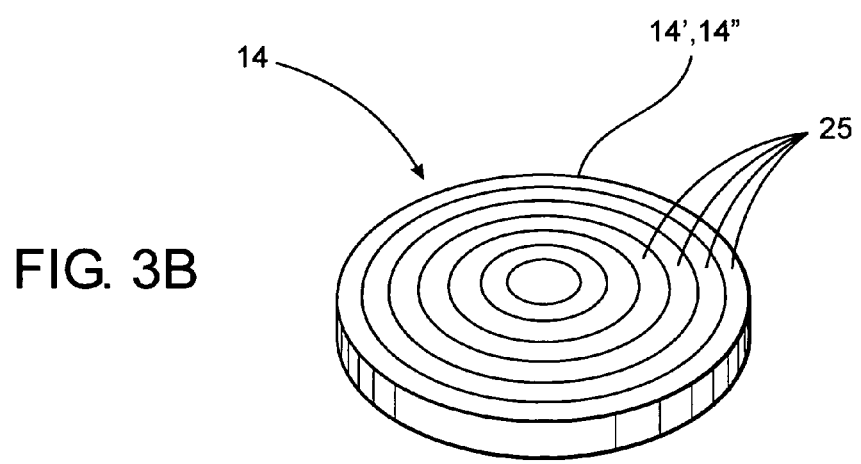
FIG. 3B is a perspective view of an additional preferred embodiment of the pole portion of the present invention in a collapsed, stored orientation.

The selected disposition of the plurality of segments 25 of the support frame 14' between the extended, operative position of FIG. 3 and the collapsed, stored position of FIG. 3B may be accomplished by means of a plurality of integral or fixedly secured, flexible material strap hinges or other appropriate connectors 27 disposed in interconnecting relation between adjacently positioned ones of the pole segments 25. The length and flexibility of the connectors 27 are such as to facilitate the selective disposition of the segments 25 in the upwardly extended, operative position of FIG. 3 or the collapsed, stored orientation of FIG. 3B.

With further regard to the embodiment of FIGS. 3 and 3B, the formation of the pole 14 from a plurality of segments 25 facilitates a positioning of the pole in its operative position wherein only a portion of its length extends upwardly from the base 12. This is in contrast to the pole 14 extending upwardly from the base 12 along its full length, as demonstrated in FIG. 3. Moreover, the aforementioned continuous converging configuration such as, but not limited to, a cone also facilitates positioning of the pole 14, in either embodiment of the collapsible structure, between the operative orientation and the stored orientation.

Figure 3C:
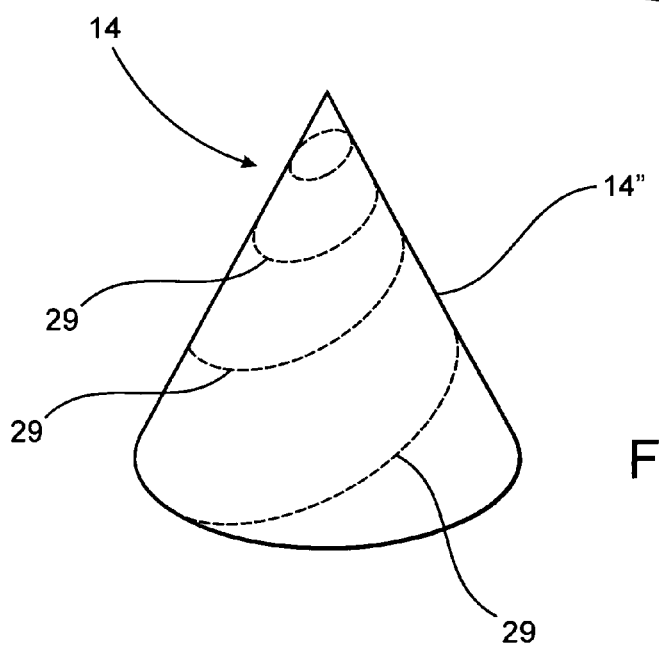
FIG. 3C is a perspective view of yet another preferred embodiment of the pole portion of the present invention.

Yet another preferred embodiment of the pole 14 and in particular the support frame 14" demonstrating the aforementioned collapsible structure is represented in FIG. 3C. Moreover, the support frame 14" may include at least one or alternatively a plurality of biasing and/or spring members or segments 29 capable of assuming the operative, upwardly extending orientation represented in FIG. 3C or the collapsed, stored orientation such as that generally represented in FIG. 3B. Further, the one or more biasing members 29 are connected to the remainder of the support frame 14" in a manner which normally tends to bias or dispose support frame 14" in the upwardly extended, operative position. Further, the upwardly directed biasing force of the biasing member(s) 29 can be sufficient to "automatically" dispose the support frame 14" in its upwardly extending, operative position once it is released from a retaining structure or assembly. Accordingly, in this embodiment the pole 14 or support frame 14" may include an automatic "pop-up type" of feature to facilitate its positioning in the operative position. While not shown, the support frame 14" and/or the biasing member(s) 29 may be operatively associated with an appropriate release or retaining structure. When activated, such a release or retaining structure allows the aforementioned biasing force to automatically dispose the pole and/or support frame in the upwardly extending, operative position. However, a sufficient compressing force exerted thereon facilitates the quick and easy assumption of the frame 14″ into the collapsed, stored orientation of FIG. 3B.

Figure 4:
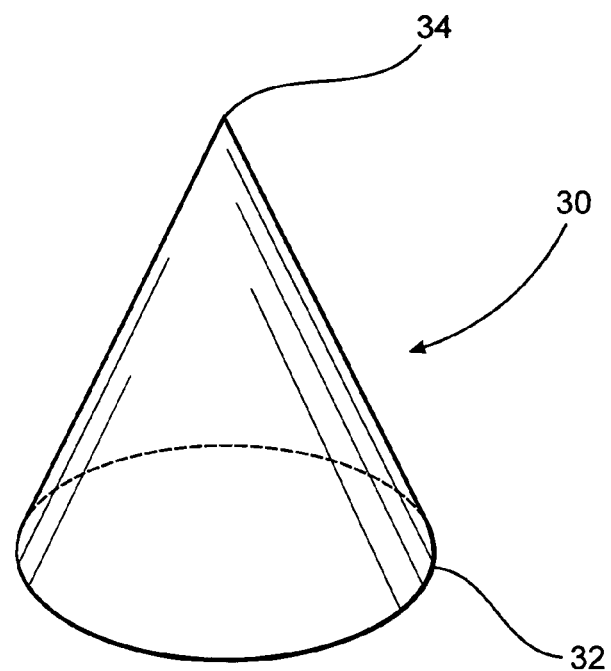
FIG. 4 is a perspective view of a cover structure formed of an absorbent material and intended to at least partially cover and/or enclose a supporting frame of the pole portion, such as represented in FIGS. 3 and 3C.
Figure 5:
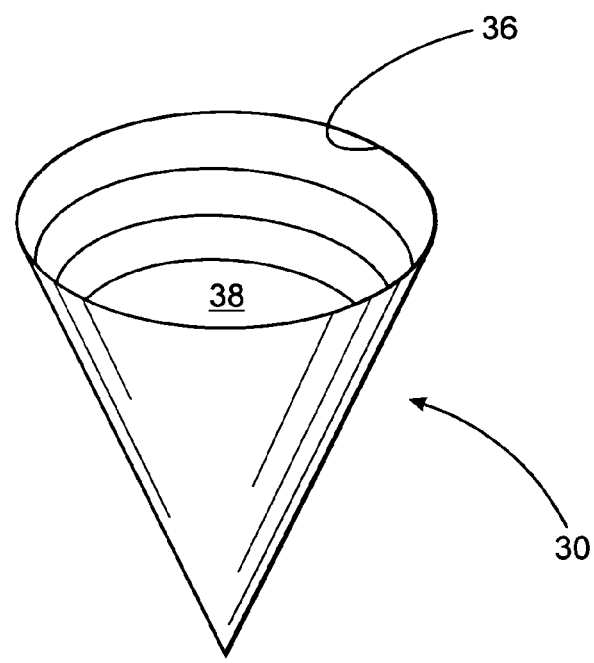
FIG. 5 is a bottom perspective view showing interior portions of the embodiment of FIG. 4.

As set forth above, both the base 12 and the pole 14 are formed, at least in part, from an absorbent material so as to absorb and retain any urine or other liquid disposed thereon. Therefore at least one preferred embodiment of the present invention is represented in FIGS. 4 and 5 and includes a covering structure generally indicated as 30. The covering structure 30 is formed from an absorbent material and may preferably, but not necessarily, assume the shape of a sleeve or like structure which corresponds in dimension and configuration to the support frame 14′ or 14″. With reference to the above noted figures and as generally set forth above, the proximal end 16 is connected to or otherwise disposed adjacent to the base 12 wherein the outer, distal end 18 is disposed in upwardly spaced relation to the base 12. Further, in order to accommodate ease of placement and/or removal, the support frames 14′ and/or 14″ include a substantially converging configuration extending along the length of the support frame 14′, 14″ from the proximal end 16 to the distal end 18. Moreover, this continuous converging shape of the support frames 14′, 14″ may be more specifically defined by a substantially conical or frusto conical shape as represented.

Therefore, the covering structure 30 also assumes a substantially corresponding converging configuration extending from the bottom or proximal end 32 to the outer distal end 34, wherein substantially corresponding converging configuration extends along the length of the sleeve like covering structure 30 from the proximal end 32 to the distal end 34. Therefore, the support frame 14′, 14″ may pass into the open end 36 of the covering structure 30 and be received within the substantially hollow interior portion 38 of the covering structure 30. In order to facilitate the placement and removable positioning of the covering structure 30 relative to the support frame 14′, 14″, the interior surface of the interior portion 38 substantially conforms to the exterior surface of the support frame 14′, 14″ thereby further defining the exterior configuration of the covering structure 30 substantially corresponding to the overall exterior configuration of the support frame 14′, 14″.

Other structural embodiments of the waste deposit station 10 of the present invention may include the base 12 being to include anyone of a variety of different configurations other than the circular or oval configuration as represented throughout the Figures. More specifically, the base may include a square, rectangular or other multi-sided configuration varying in size depending upon the specific location which it is intended to be positioned (See FIG. 1A) as well as the size of the animal intended to use the waste deposit station 10. Similarly, the pole including both the support frames 14′, 14″ as well as the covering structure 30 may correspond in dimension and configure to one another and vary in dimension and height or distance of outer extension relative to the base, dependent upon the size of the animal intended to use the station 10 as well as its intended location. In addition the pole 14 and/or support frame 14′, 14″ may extend upwardly from the base into its upwardly extending, operative position in an orientation other than a vertically upright orientation as represented throughout some of the accompanying Figures. By way of example only, when the pole 14 or support frame 14′, 14″ assumes the operative position, it may be automatically. Manually or selectively disposed or shaped into a bent or curvilinear configuration along at least a portion of its extended length.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A station to facilitate the deposit of urine in a normally inappropriate environment by a male dog, said station comprising:
    a base disposable in overlying relation to a supporting surface associated with the inappropriate environment, said base at least partially formed of an absorbent, flexible, at least partially foldable material,
    a pole having an elongated configuration disposed on said base,
    said pole extending inwardly and upwardly from said base to a predetermined height, and
    an absorbent material covering structure disposed in overlying relation to said pole.

2. A station as recited in claim 1 further comprising a connecting assembly at least partially formed from an adhesive material, said connecting assembly disposed in adhesively connecting relation between the supporting surface and said base.

3. A station as recited in claim 1 wherein said base includes an adhesive connecting assembly disposed and structured to adhesively connect the base to the supporting surface.

4. A station as recited in claim 3 wherein said base is formed of a flexible, at least partially foldable material.

5. A station as recited in claim 1 wherein said base further comprises an under layer formed of liquid impermeable material and disposed in adjacent, at least partially liquid receiving relation to said absorbent material of said base.

6. A station as recited in claim 5 wherein said under layer at least partially defines an undersurface of said base disposed in confronting relation to the support surface.

7. A station as recited in claim 1 wherein said base comprises at least a portion thereof having sufficient flexibility to be concurrently disposed in covering relation to horizontal and adjacent, substantially transverse supporting surfaces.

8. A station as recited in claim 1 wherein said covering structure comprises a sleeve including an at least partially hollow interior dimensioned to receive said pole therein.

9. A station as recited in claim 8 wherein said hollow interior comprises an interior surface correspondingly dimensioned and configured to an exterior surface of said pole.

10. A station as recited in claim 9 wherein said sleeve structure comprises an exterior surface configuration corresponding to a configuration of said exterior surface of said pole.

11. A station as recited in claim 10 wherein said pole comprises a proximal end disposed adjacent said base and an opposite, upwardly disposed distal end; said base comprising a continuously converging configuration extending along the length thereof from said proximal end to said distal end.

12. A station as recited in claim 11 wherein said continuously converging configuration is defined by a conical configuration.

13. A station as recited in claim 1 wherein said pole is fixedly connected to said base.

14. A station as recited in claim 1 wherein said pole is removably disposed adjacent said base.

15. A station as recited in claim 1 wherein said pole comprises a collapsible structure disposable in an extended, operative orientation and a substantially collapsed, stored orientation.

16. A station as recited in claim 15 wherein said collapsible structure comprises at least one biasing member disposed and structured to normally bias said pole in said extended, operative orientation.

17. A station as recited in claim 15 wherein said collapsible structure comprises a plurality of layers collectively movable between said extended, operative orientation and said substantially collapsed, stored orientation; said plurality of layers telescopically movable relative to one another and collectively disposed in successive positions when in said substantially collapsed stored orientation.

18. A station to facilitate the deposit of urine in a normally inappropriate environment by a male dog, said station comprising:
- a base disposable in overlying relation to a supporting surface associated with the inappropriate environment, said base at least partially formed of an absorbent, flexible, at least partially foldable material,
- a pole having an elongated configuration disposed on said base in inwardly spaced relation to the periphery of said base,
- said pole extending inwardly and upwardly from said base to a predetermined height, and
- an absorbent material covering structure disposed in removable, at least partially covering relation to said pole;
- said covering structure comprises a sleeve including an at least partially hollow interior dimensioned to receive said pole therein.

19. A station as recited in claim 18 wherein said pole comprises a proximal end disposed adjacent said base and an opposite, upwardly disposed distal end; said base comprising a continuously converging configuration extending along the length thereof from said proximal end to said distal end.

20. A station as recited in claim 19 wherein said hollow interior comprises an interior surface correspondingly dimensioned and configured to an exterior surface of said pole; said sleeve structure further comprising an exterior surface configuration corresponding to a configuration of said exterior surface of said pole.

21. A station as recited in claim 20 wherein said base and said pole both comprise substantially corresponding conical configurations.

\* \* \* \* \*